United States Patent [19]
Ishitsuka et al.

[11] Patent Number: 5,016,396
[45] Date of Patent: May 21, 1991

[54] FIXING STRUCTURE OF SASHES OF MOTOR VEHICLE DOOR

[75] Inventors: Keiichi Ishitsuka; Shinji Tsunoda, both of Gunma, Japan

[73] Assignee: Fuji Jukogyo Kabushiki Kaisha, Tokyo, Japan

[21] Appl. No.: 592,591

[22] Filed: Oct. 4, 1990

[30] Foreign Application Priority Data

Oct. 12, 1989 [JP] Japan ................................. 1-119536

[51] Int. Cl.$^5$ .............................................. B60J 5/04
[52] U.S. Cl. ......................................... 49/502; 49/374
[58] Field of Search .................... 49/502, 374; 296/146

[56] References Cited

U.S. PATENT DOCUMENTS

| | | | |
|---|---|---|---|
| 4,034,509 | 7/1977 | De Rees | 49/374 X |
| 4,473,252 | 9/1984 | Tomforde et al. | 49/502 X |
| 4,761,915 | 8/1988 | Marz | 49/502 X |
| 4,788,795 | 12/1988 | Pinsonneault | 49/502 X |

FOREIGN PATENT DOCUMENTS 59-120624 4/1983 Japan .

Primary Examiner—Philip C. Kannan
Attorney, Agent, or Firm—Beveridge, DeGrandi & Weilacher

[57] ABSTRACT

A fixing structure of sashes of a motor vehicle door comprises a main door sash defining an upper and front contour of the door, a middle door sash extending below and along the main door sash, and a coupling reinforcing member securely coupling the leading ends of the two sashes. The coupling reinforcing member is bolted to a window shoulder reinforcing members on outer and inner door panels. A lower end portion of the coupling reinforcing member is coupled to the inner door panel via an adjusting bolt to make the lower end portion of the coupling reinforcing member adjustingly displaceable toward and away from the inner door panel. By adjusting the adjusting bolt, the coupling reinforcing member is angularly moved whereby the windowpane attaching plane of the middle door sash can be finely adjusted so as to match the windowpane attaching plane of the main door sash.

6 Claims, 2 Drawing Sheets

FIXING STRUCTURE OF SASHES OF MOTOR VEHICLE DOOR

BACKGROUND OF THE INVENTION

The present invention relates to a fixing structure of sashes of a motor vehicle door, and more particularly, to a fixing structure of a main sash in an outer frame portion of a window and a middle sash provided between fixed and movable panes of glass of a motor vehicle door having the windowpane divided into the fixed and the movable panes.

Japanese Utility Model Laid-Open Pub. No. 59-120624 discloses a door window device for a motor vehicle, in which the windowpane is divided into a fixed upper pane and a movable lower pane. The upper pane has a concave edge forming member along the lower edge thereof, while the lower pane has a convex edge forming member along the upper edge thereof. The concave and convex members combinedly form a middle door sash when the movable lower pane is elevated against the fixed upper pane.

On the other hand, in order to secure the rigidity of an opening part of a window shoulder of a conventional motor vehicle door, the only method available is to strengthen a reinforcing member longitudinally attached along the window shoulder to the outer panel of the door and to the inner panel thereof. Particularly, the longer the door in the front-to-rear direction, the more difficult it becomes to secure the rigidity of the opening part of the window shoulder.

In order to improve the rigidity of the window shoulder, there have been devised a structure comprising a main door sash defining the upper and front contour of the door, a middle door sash disposed below and along the main door sash, and coupling reinforcing means securely coupling the leading ends of the two sashes, the coupling reinforcing means being fixed to longitudinal reinforcing members extending along the window shoulder of the door.

SUMMARY OF THE INVENTION

The object of the present invention is to provide a fixing structure of sashes of a motor vehicle door, wherein the rigidity of the middle door sash is increased, fine angular adjustment of the middle door sash can be made, and assembling productivity is increased.

According to the present invention, the above object is attained by a fixing structure of sashes of a motor vehicle door, having a main door sash defining an upper and front contour of the door, and a middle door sash extending below and along the main door sash, said structure comprising: a coupling reinforcing member fixedly secured to leading ends of said main and middle door sashes at mutually spaced leading and trailing end portions of the coupling reinforcing member; fastening means for mounting the coupling reinforcing member to a leading part of a window shoulder of the door, between said leading and trailing end portions; and an adjusting bolt for adjustably mounting a lower end portion of the coupling reinforcing member to the door to angularly adjust the attitude of the middle door sash.

While the fixing rigidity of the middle sash is thus increased according to the present invention, a fine angular adjustment of the middle door sash can be effected by the adjusting bolt and besides the productivity in assembling the structure is increased.

Other objects and features of the present invention will become understood from the following detailed description referring to the accompanying drawings.

DESCRIPTION OF THE PREFERRED EMBODIMENT

A detailed description will subsequently be given of an embodiment of the present invention with reference to FIGS. 1 to 4.

Figure 1:
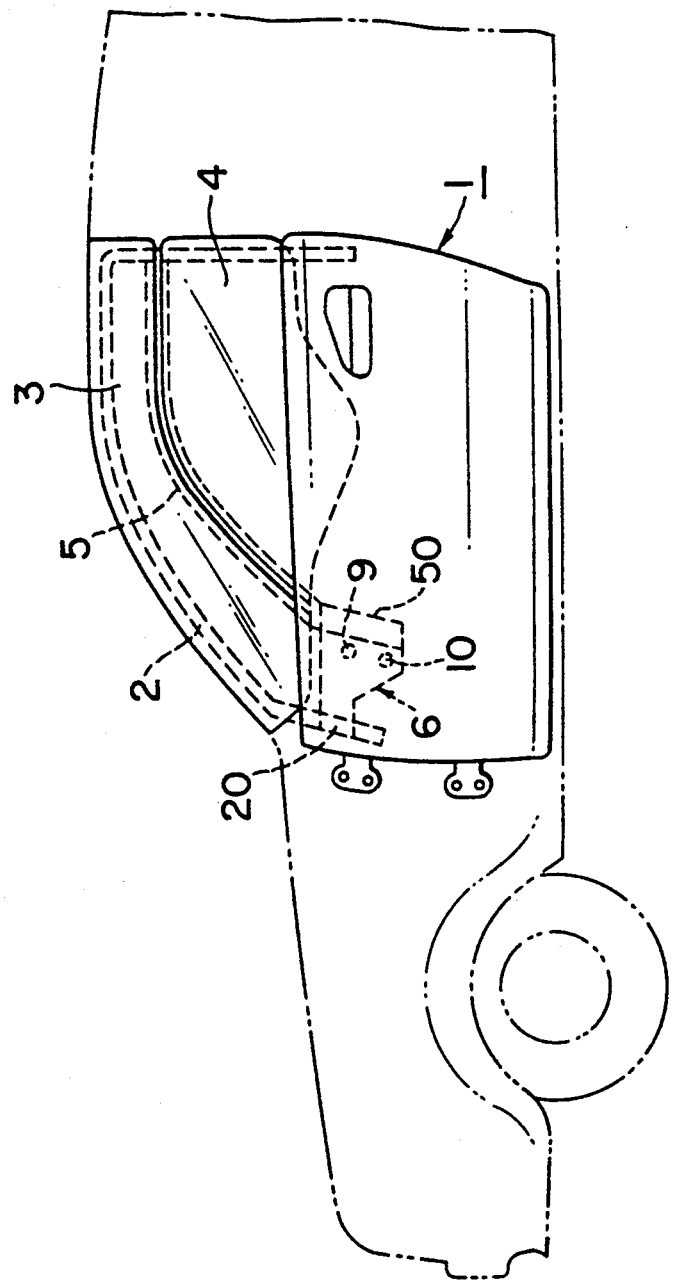
FIG. 1 is a side view illustrating a motor vehicle door to which the present invention is applied.

As shown in FIG. 1, a motor vehicle door 1 is provided with a windowpane which is divided into two, that is, a fixed pane 3 of glass bonded to a main door sash 2 from its front to upper portion, and a movable pane 4 of glass an upper edge of which extends along the lower edge of the fixed pane 3 of glass. There is also arranged a middle door sash 5 extending along the lower edge of the fixed pane 3 of glass between the fixed pane 3 and the movable pane 4.

Figure 2:
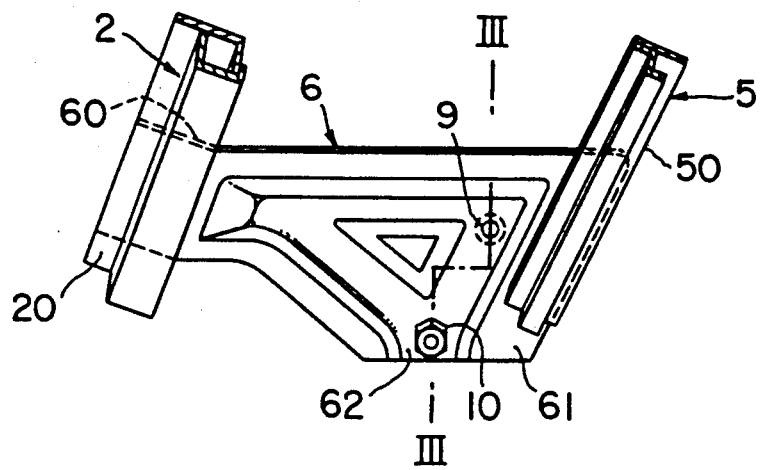
FIG. 2 is an enlarged view illustrating a coupling reinforcing member and leading ends of sashes.
Figure 3:
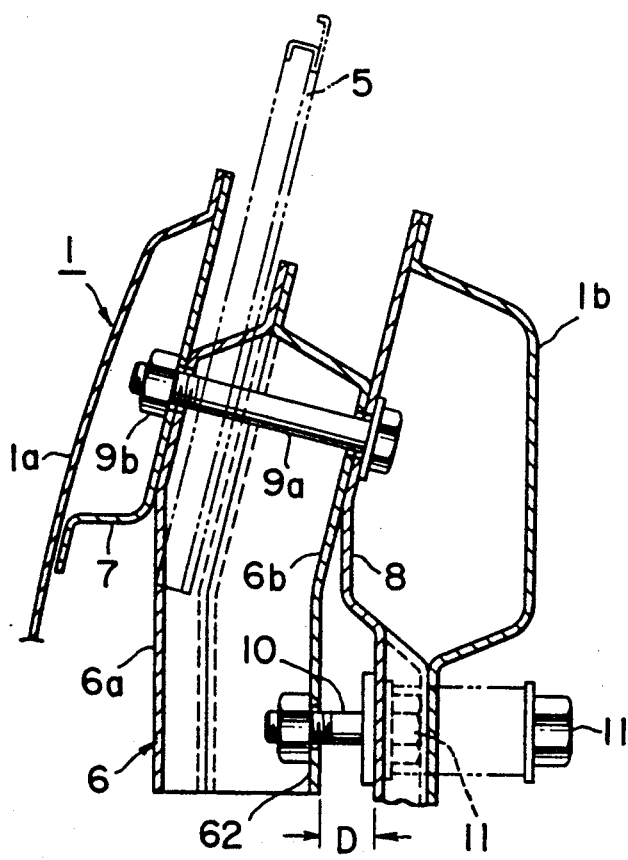
FIG. 3 is a sectional view taken on line III—III of FIG. 2.
Figure 4:
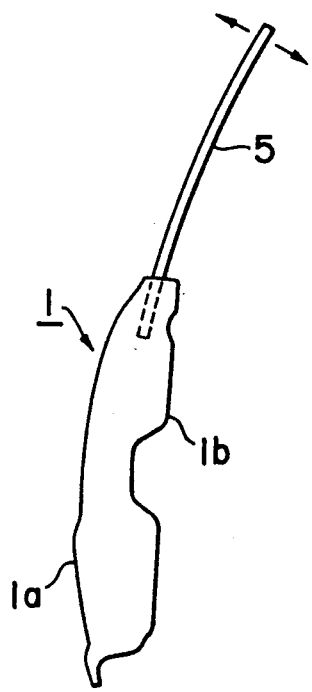
FIG. 4 is an explanatory view of angular adjustment of the sash.

The leading end portion 20 of the main sash 2 and the leading end portion 50 of the middle sash 5 are, as shown in FIG. 2, coupled together through a coupling reinforcing member 6. As shown in FIG. 3, the coupling reinforcing member 6 comprises a pair of opposing brackets 6a and 6b. The side edges of the bracket 6a and the side edges of the bracket 6b are welded together and the central portions of the two brackets 6a and 6b are protruded sideward, whereby the coupling reinforcing member 6 is formed hollow. As indicated in FIG. 2, the main sash 2 and the middle sash 5 are welded to a leading end portion 60 and a trailing end portion 61 of the reinforcing member 6, respectively.

As indicated in FIG. 3, the door 1 has an outer panel 1a and an inner panel 1b. Reinforcing members 7 and 8 are fixed to the inner surfaces of the outer and inner panels 1a and 1b, respectively, along the upper edges of the panels. The coupling reinforcing member 6 is disposed between a front part (toward the door pivot) of the reinforcing member 7 and a front part of the reinforcing member 8. The coupling reinforcing member 6 is bolted to the reinforcing members 7 and 8 by means of a bolt 9a and a nut 9b. Since the front parts of the reinforcing members 7, 8 are coupled together by means of the coupling reinforcing member 6, the rigidity of the main door sash 2 and the middle door sash 5 to the respective panels 1a, 1b is increased.

The coupling reinforcing member 6 has a lower end portion 62 shown in FIG. 2, which is apart downwardly from the bolt 9a and in the vicinity of the leading end portion 50 of the middle sash 5. As shown in FIG. 3, the lower end portion 62 is coupled to a lower end portion of the reinforcing member 8 by means of an adjusting bolt 10. The adjusting bolt 10 is rotated by rotating a conical nut 11 engaging therewith from the passenger seat side.

With the adjustment of the bolt 10, the distance D between the lower end portion 62 and the inner door panel 1b is variable. By varying the distance D therebetween, the coupling reinforcing member 6 is moved angularly as shown by arrow A in FIG. 4, and the angle of inclination of the middle sash 5 (in the crosswise direction of the passenger compartment) is finely adjusted. When the adjusting bolt 10 and the conical nut 11 are thus adjusted, the coupling reinforcing member 6 slightly changes in attitude as if it is twisted. Because the main sash 2 is far from the bolt 10, the main sash 2 remains unaffected by the adjustment of the angle of the middle sash 5.

The adjusting mechanism described above makes it possible to minimize the difference between the windowpane attaching plane of the main sash 2 and the windowpane attaching plane of the middle sash 5. Thus, the middle sash 5 is prevented from deviating from its exact windowpane attaching plane, and the external appearance of the middle sash 5 is improved. Moreover, the thickness of an adhesive for use in bonding the fixed pane 3 to the middle sash 5 becomes even when the fixed pane 3 is bonded.

The main sash 2 and the middle sash 5 are integrally combined together by means of the coupling reinforcing member 6 and both the sashes can thus be handled as a complete unit. The sashes 2 and 5 are set to the respective door panels 1a, 1b and the bolt 9 is used to tighten the panels temporarily. The sashes 2 and 5 in this state are adjustingly placed at a proper position with respect to the door panels 1a and 1b and subjected to spot welding. Subsequently, the adjusting bolt 10 and the conical bolt 11 are employed to adjustingly couple the lower end portion 62 of the coupling reinforcing member 6 to the inner door panel 1b, so that they are used for finely adjusting the angle between the sashes 2 and 5.

As set forth above, the fixing structure of sashes for a motor vehicle door is formed according to the present invention through the steps of coupling together the leading end portion 20 of the main sash 2 and the leading end portion 50 of the middle sash 5 via the coupling reinforcing member 6, bolting the coupling reinforcing member 6 to the respective door panels 1a, 1b and coupling the lower end portion 62 of the coupling reinforcing member 6 to the inner door panel 1b via the adjusting bolt 10 to make the lower end portion 62 adjustably detachable from the inner door panel 1b. With the provision of the coupling reinforcing member 6, the condition of joining the main and the middle sashes 5 and 6 to the respective panels 1a and 1b, particularly of jointing the middle sash 5 to the corresponding panel, is strengthened. Since the angle of the middle sash 5 on the outside of the passenger seat is finely adjustable, the deviation of the middle sash from the correct plane is simply corrected. Workability in adjusting middle sashes on production lines is therefore improved when weather strips are fitted, when the height of panes of glass is adjusted, and when fixed panes of glass are bonded. Further, the difference between the pane attaching plane of the main sash and that of the middle sash is minimized, with the excellent practical effect of improving the external appearance of the middle sash.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fixing structure of sashes of a motor vehicle door, having a main door sash defining an upper and front contour of the door, and a middle door sash extending below and along the main door sash, said structure comprising:
    a coupling reinforcing member fixedly secured to leading ends of said main and middle door sashes at mutually spaced leading and trailing end portions of the coupling reinforcing member;
    bolt means for mounting the coupling reinforcing member to a leading part of a window shoulder of the door, between said leading and trailing end portions; and
    adjusting means for adjustably mounting a lower end portion of the coupling reinforcing member to the door to angularly adjust the attitude of the middle door sash.

2. The fixing structure according to claim 1, wherein said lower end portion of the coupling reinforcing member is in the vicinity of said leading end of the middle door sash.

3. The fixing structure according to claim 1, wherein said window shoulder has a pair of longitudinal reinforcing members extending therealong in mutually opposed disposition, and said bolt means is passed through the longitudinal reinforcing members and the coupling reinforcing member.

4. The fixing structure according to claim 3, wherein said adjustable means is passed through the inner one of said longitudinal reinforcing members and said lower end portion of the coupling reinforcing member.

5. The fixing structure according to claim 4, wherein said adjustable means is an adjustable bolt to be rotated to change the distance between the coupling reinforcing member and inner one of the longitudinal reinforcing members.

6. The fixing structure according to claim 1, wherein said coupling reinforcing member comprises a pair of opposite brackets which are welded together along side edges thereof and the parts of the bracket other than the side edges are protruded outwardly to form a hollow space which provides a thickness to the coupling reinforcing member.

* * * * *